United States Patent [19]

Momiyama

[11] Patent Number: 4,856,628
[45] Date of Patent: Aug. 15, 1989

[54] AUTOMATED MECHANICAL TRANSMISSION SYSTEM FOR USE IN COMMERCIAL VEHICLES

[75] Inventor: Fujio Momiyama, Hino, Japan
[73] Assignee: Hino Jidosha Kogyo Kabushiki Kaisha, Tokyo, Japan
[21] Appl. No.: 119,476
[22] Filed: Nov. 12, 1987
[51] Int. Cl.$^4$ .................... B60K 41/22; F16D 25/063; F16D 13/74
[52] U.S. Cl. ................. 192/3.58; 192/70.12; 192/86; 192/113 B
[58] Field of Search .................... 192/3.55, 3.58, 3.61, 192/70.12, 86, 109 F, 113 B

[56] References Cited

U.S. PATENT DOCUMENTS

| | | | |
|---|---|---|---|
| 3,753,478 | 8/1973 | Shiber | 192/86 X |
| 4,142,619 | 3/1979 | Spokas | 192/113 B |
| 4,299,320 | 11/1981 | Delsmen et al. | 192/113 B |
| 4,625,840 | 12/1986 | Kojima et al. | 193/3.58 |
| 4,753,332 | 6/1988 | Bieber et al. | 192/70.12 |

Primary Examiner—Leslie A. Braun
Assistant Examiner—Richard M. Lorence
Attorney, Agent, or Firm—Staas & Halsey

[57] ABSTRACT

An automated mechanical transmission system for use in commercial vehicles comprises an oil spray type oil hydraulic clutch, a mechanical transmission having a shift cylinder, a shift valve, a select cylinder, and a select valve, a hydraulic system control circuit, a clutch oil spray circuit, and a clutch/transmission select valve. The oil hydraulic clutch includes an oil hydraulic clutch servo cylinder for sandwiching a clutch disk between a pressure plate and a clutch cover, the system control circuit includes a high pressure side and a low pressure side hydraulic clutch control lines connected with the clutch servo cylinder, and a hydraulic transmission control line connected with the shift cylinder and select cylinder through the shift valve and select valve. A pressure control valve actuated by a pressure control pilot valve is disposed at the low pressure side hydraulic clutch control line. The pressure control valve adjusts oil pressure of the oil hydraulic circuit to connect or disconnect the clutch, thereby to gear shift the transmission. An oil spray control valve is disposed in the clutch oil spray circuit and controls the flow rate of oil displayed to the clutch disk spray according to each state of the clutch.

15 Claims, 7 Drawing Sheets

Fig. 6

| ADAPTIVE CONTROLS | PURPOSE | CLUTCH OIL TEMP. (°C)<br>-10  0  10  20  30  40  50  60 |
|---|---|---|
| (1) ENGAGE OR DISENGAGE CLUTCH WHEN GEAR IS IN NEUTRAL | •WARMING UP OF CLUTCH OIL<br>•PREVENTING HESITATION | ENGAGE \| DISENGAGE (NORMAL) |
| (2) DECREASE OIL SPRAY VOLUME BEFORE START MOVING | •PREVENTING CREEP | DECREASE \| NORMAL |
| (3) WAIT FOR A WHILE TO SHIFT OUT GEAR AFTER CLUTCH RELEASE | •PREVENTING GEAR SHIFT NOISE | WAIT \| NOT WAIT |
| (4) INCREASE GEAR SHIFTING FORCE | •SPEEDUP OF GEAR CHANGE | INCREASE \| NORMAL |
| (5) INCREASE GEAR SHIFT OUT FORCE | •SPEEDUP OF GEAR CHANGE | INCREASE \| NORMAL |

AUTOMATED MECHANICAL TRANSMISSION SYSTEM FOR USE IN COMMERCIAL VEHICLES

BACKGROUND OF THE INVENTION

1. Field of the Invention

This invention relates to an automated mechanical transmission system for use in commercial vehicles, the system for electro-hydraulically automating a combination of a mechanical friction clutch and a mechanical transmission, and more particularly to an automated mechanical transmission system, in which the pressure of clutch disk is directly controlled by pressure oil, the transmission is a counter shaft type, and the oil hydraulic circuit for controlling them is an oil hydraulic feed back type.

2. Description of the Related Art

In the present, pneumatically controlled type automated mechanical transmission systems have been widely used for city bus systems.

In the transmission system, the clutch is an oil-sprayed spring type. The clutch control is a spring chamber type and actuated pneumatically. The transmission is a constant-mesh countershaft type and the transmission control employs the shift and select shaft which is pushed and pulled by a select air cylinder and twisted by a shift air cylinder.

City buses with this system are used by many customers in Japan. Its fuel economy is equal to or slightly better than that of a manual shift transmission.

In city bus use, running smoothness is excellent, while the quickness of response is a little inferior because of the relatively large torque interruption at gear shifting.

SUMMARY OF THE INVENTION

It is therefore an object of the present invention to provide an automated mechanical transmission system for use in commercial vehicles, in which a combination of a mechanical friction clutch and a mechanical transmission is made possible by shortening the gear shifting time, so that efficiency, fuel charge and economy are improved.

Another object of the invention is to provide an automated mechanical transmission system for use in commercial vehicles, in which a combination of a mechanical friction clutch and a mechanical transmission is automated by means of electro-hydraulic control and various abilities such as drivability and power capacity are improved.

A further object of the invention is to provide an automated mechanical transmission system for use in commercial vehicles, in which start moving and gear shift are smoothly performed without clutch stroke.

A still further object of the invention is to provide an automated mechanical transmission system for use in commercial vehicles, in which power is smoothly transmitted.

In relation to the above-mentioned objects, the key to the automated mechanical transmission system for use in commercial vehicles according to the present invention is to electrically automate a combination of mechanical friction clutch and countershaft type transmission. The countershaft type transmission features low friction loss compared with other transmissions such as the planetary type, because it has fewer gears and bearings and no multi-plate-clutchess/brakes to cause a drag. And it is well-known that the mechaical friction clutch displays very good efficiency. Hence, there is no other combination economically superior to this. Yet, this combination takes longer for gear shifting because shifting into one gear can be done only after shifting out of another gear.

Shortening this gear shift time is, therefore, the essential problem to be solved if the performance of the automated mechanical transmission is to be maximized.

FIG. 7 shows the necessity of shortening gear change time and the actual toime taken by some statistical study of manual shift transmission in seconds. A truck requires a shorter shifting time than a bus, and a medium-duty truck requires less than a heavy-duty truck. Methods that can be used to shorten gear shift time are shown in Table 1.

The first method is to quickly synchronize the engine speed with the speed of the next gear step. The second is to finish the processes of "clutch release, gear shift out, gear select, gear shift in, and clutch engage" before the engine speed synchronization is completed.

The means that satisfy the first method are to improve engine speed response (especially of decreasing speed), to reduce the rotational inertia of the clutch, and to narrow the speed range in which the engine speed has to be accelerated or decelerated for a shift to the next gear step. The means for the second method are to speed up the clutch stroke, to shorten the clutch stroke itself, to increase the gear shift and select speed and to employ a new shift mechanism capable of simultaneous shifting in/out of gear.

The automated mechanical transmission system of the present invention uses a smaller diameter clutch for reduced inertia to satisfy the first method above. The insufficient torque capacity of the clutch resulting from the selection of a smaller diameter has been compensated for by using hydraulic pressure in place of coil springs.

Use of the hydraulic pressure controlled clutch makes it possible to remove the transmitting torque without any clutch stroke but only by decreasing the pressure. The selection of hydraulic power cleared the way for not only the clutch but also the shift and select cylinders all to be controlled hydraulically. The hydraulic control makes it easy to control the shift force more effectively, thus shortening the shift time. In other words, the selection of a smaller diameter clutch leads to the selection of hydraulic control, which in turn satisfies the second method mentioned above for shortening the gear shift time.

TABLE 1

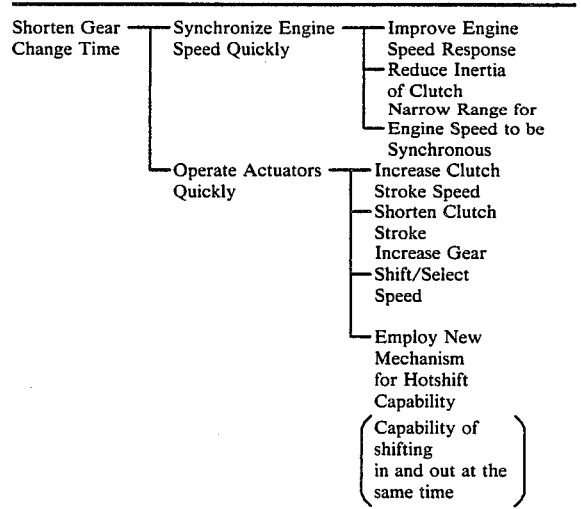

Table 2 shows the specifications of a medium-duty truck incorporating the automated mechanical transmission system of the invention. FIG. 1 shows the automated mechanical transmission system of the invention installed on the medium-duty truck.

TABLE 2

| Vehicle Specifications | | | |
|---|---|---|---|
| | Overall Length (m) | | 7.50–9.48 |
| | Overall Width (m) | | 2.23 |
| | Overall Height (m) | | 2.41 |
| | Wheel Base (m) | | 4.25–5.50 |
| | Capacity (kg) | | Payload 3750–4500 |
| Engine | Model | H07C | H06CT |
| | Max Power | 132 kw/3000 rpm | 151 kw/3000 rpm |
| Clutch | Type | Hydraulic-Pressure-Controlled /Oil Sprayed Type | |
| | Disk Size | φ 325 mm | |
| Transmission | Type | Countershaft Type | |
| | Speed | 6-Speeds | |

BRIEF DESCRIPTION OF THE DRAWINGS

FIG. 6 is an illustration showing the temperature logics for adaptive control of the automated transmission system.

DESCRIPTION OF THE PREFERRED EMBODIMENT

Figure 1:
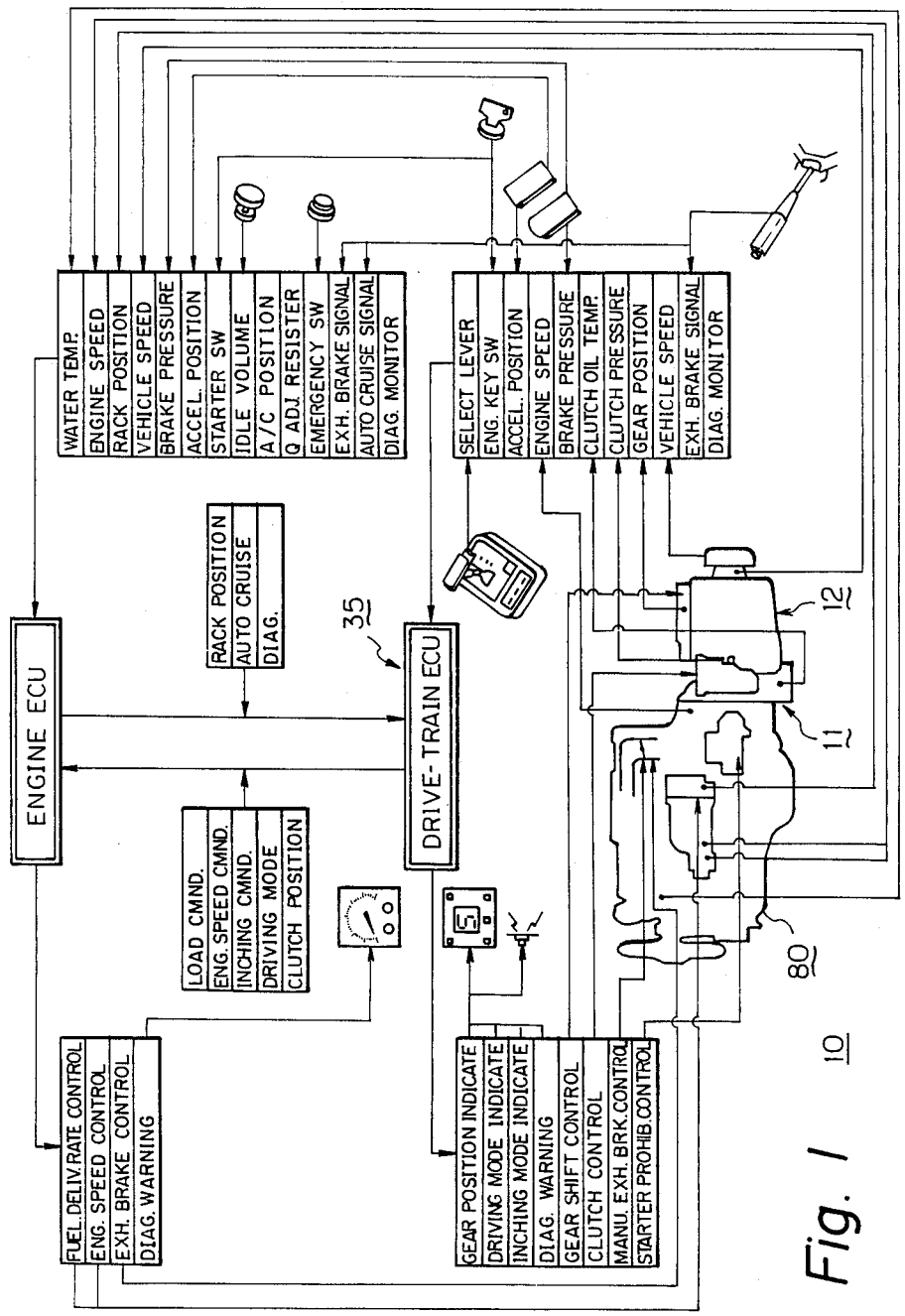
FIG. 1 is an electrical system diagram of an automated mechanical transmission system for use in commercial vehicles, which is applied to a medium sized-truck.
Figure 2:
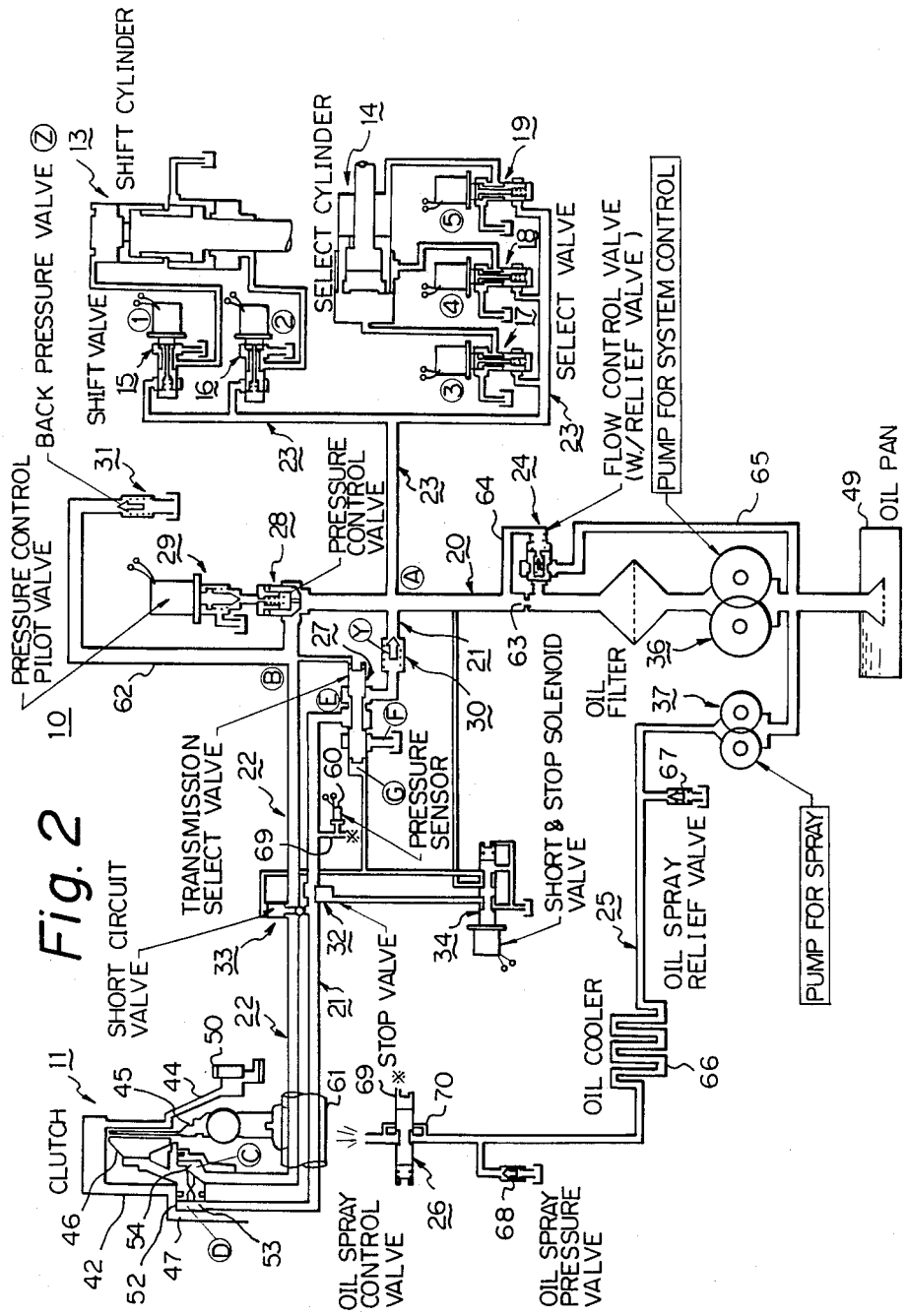
FIG. 2 is a schematic view of the automated transmission system of FIG. 1.

One preferred embodiment of an automated mechanical transmission system for use in commercial vehicles according to the present invention, will be described hereunder with reference to the accompanying drawings.

FIGS. 1 through 6 illustrate one embodiment of an automated mechanical transmission system 10 of the present invention which is mounted on a medium sized truck.

The automated mechanical transmission system 10 comprises an oil spray type oil hydraulic clutch 11, a counter shaft type transmission 12 including a shift cylinder 13 and a select cylinder 14 for operating a gear shift and select shift (gear shift and select lever), and shift solenoid valves 15 and 16 and select solenoid valves 17, 18 and 19 for controlling the direction of the flow of a pressure oil flowing in the corresponding shift cylinder 13 and select cylinder 14, a hydraulic system control circuit 20 including a high pressure side hydraulic clutch control line 21, a low pressure side hydraulic clutch control line 22 and a hydraulic transmission control line 23 and further including a flow control valve 24, a clutch oil spray circuit 25 provided with an oil spray control valve 26, a clutch/transmission select valve 27, a pressure control valve 28 provided with a pressure control pilot valve 29, a check valve 30, a back pressure valve 31, a stop valve 32, and a short circuit valve 33 disposed at the hydraulic system control circuit 20, a short and stop solenoid valve 34 for actuating the stop valve 32 and short circuit valve 33, and an electronic control unit 35. In this automated transmission system 10, the pressure control valve 28 is actuated by the pressure control pilot valve 29 to adjust oil pressure of the oil hydraulic circuit 20, to connect or disconnect the hydraulic clutch 11 and to speed change the transmission 12, and simultaneously, the oil spray control valve 26 adjusts the flow rate of oil which is sprayed to the clutch disk 45 according to the state of the oil hydraulic clutch 11.

In this automated mechanical transmission system 10, the electronic control unit 35, as apparent from FIG. 1, comprises an input circuit which is electrically connected to a select lever position sensor, an accelerator position sensor, an engine speed sensor, a brake oil hydraulic sensor, a clutch oil hydraulic sensor 60, a gear position sensor, a vehicle speed sensor, etc., and an output circuit which is electrically connected to a solenoid coil of the shift solenoid valves 15 and 16, select solenoid valves 17, 18 and 19, pressure control pilot valve 29, and short and stop solenoid valve 34. The ECU controls an electric current flowing in the solenoid coils in response to signals from the sensors upon actuation of a select lever. The short and stop solenoid valve 34, pressure control valve 28, shift solenoid valves 15 and 16, and select solenoid valves 17, 18 and 19 are actuated according to a position of the select lever to allow the oil hydraulic clutch 11 to be connected or disconnected, and to allow the transmission 12 to perform a shifting motion based on a preset shift map relating to the transmission 12.

Of course, the electronic control unit 35 is communicatably electrically connected with an electronic control unit for controlling the engine 80, so that the clutch 11 can be properly connected or disconnected and the transmission 12 can be properly shifted according to a driving state of the engine 80.

Figure 3:
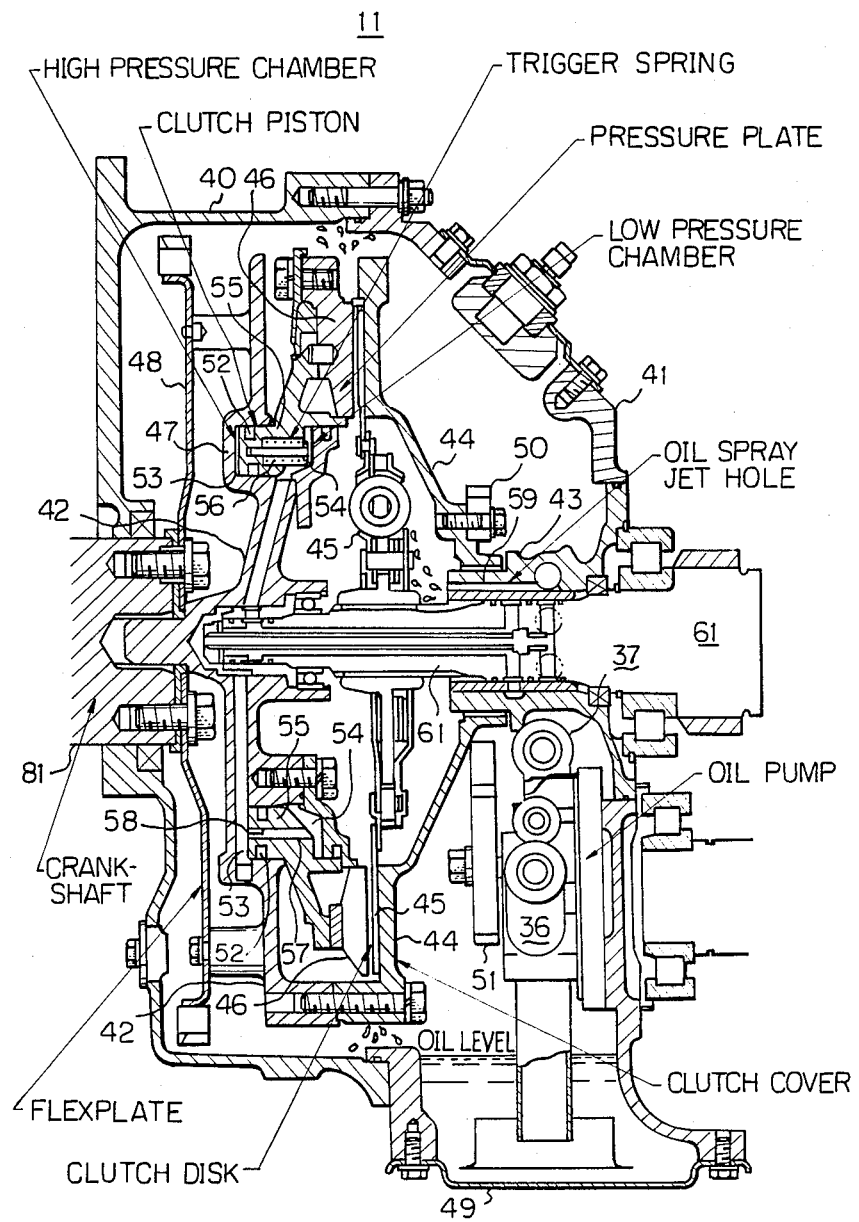
FIG. 3 is a sectional view taken in the axial direction of a hydraulic pressure controlled and oil sprayed clutch which is employed in the automated transmission system.

The oil hydraulic clutch 11, as apparent from FIG. 3, includes a fly wheel housing 40 bolted to a rear surface of a cylinder block of the engine, a clutch housing 41 bolted to the fly wheel housing 40 at a front surface of a gear casing of the transmission 12, a fly wheel 42, in a sealed state, rotatably fitted in an input shaft 61 of the transmission 12 in a space enclosed by the fly wheel housing 40 and clutch housing 41, a clutch cover 44 rotatably fitted in an input shaft cover 43 so that the former can be rotated around the latter and bolted to the fly wheel 42, a clutch disk 45 spline engaged with the input shaft 61 between the fly wheel 42 and clutch cover 44, a pressure plate 46, an oil hydraulic clutch servo cylinder 47, and a flex plate 48 for securing the fly wheel 42 to a crank shaft 81 of the engine 80. A lower part of the oil hydraulic clutch 11 is used as an oil sump having an oil pan 49. The input shaft cover 43 is formed with an oil spray jet hole 59 so that oil can be sprayed to the clutch disk 45 through the oil spray jet hole 59.

When the clutch 11 is disengaged, pressure oil is supplied in the low pressure side cylinder chamber 54 of the oil hydraulic clutch servo cylinder 47.

Since each passage 57 is provided with a throttle 58 or is formed with a narrow passage, there is a little of the pressure oil which flows into the low pressure side cylinder chamber 54 from the high pressure side cylinder chamber 53. Consequently, the clutch piston (ring piston) 55 is moved along the cylinder 52 in the left direction and the pressure plate 46 is separated from the clutch disk 45. Accordingly, the clutch 11 is disengaged.

The oil hydraulic clutch 11 further includes oil hydraulic pumps 36 and 37 bolted to an inner surface of the clutch housing 41, and a pump gear 51 meshed with a drive gear 50 bolted to the clutch cover 44. Oil from oil pan 49 is thus pressurized and fed to the system control circuit 20 and clutch oil spray circuit 25.

The oil hydraulic clutch servo cylinder 47 is built in the fly wheel 42 for holding the pressure plate 46, and for urging the pressure plate 46 against a facing of the clutch disk 45, thereby sandwiching the clutch disk 45 between the clutch cover 44 and pressure plate 46, and separating the pressure plate 46 from the clutch disk 45 to connect or disconnect the clutch disk.

The oil hydraulic clutch servo cylinder 47 includes an annular cylinder 52 formed in the fly wheel 42, an annular piston 55 reciprocally slidably fitted in the annular cylinder 52 to define a high pressure side cylinder chamber 53 and a low pressure side cylinder chamber 54 within the annular cylinder 52, and a plurality of trigger springs 56 arranged in the low pressure side cylinder 54. The annular piston 55 is formed with a plurality of communication passages 57 for communicating the high pressure side cylinder chamber 53 with the low pressure side cylinder chamber 54. Each communication passage 57 is provided with a throttle 58 so that pressure oil always flows into the low pressure side cylinder chamber 54 from the high pressure side cylinder chamber 53, and so that bubbles mixed into the pressure oil are discharged from the oil pressure circuit 20. Of course, if the communication passage 57 is embodied as a narrow passage, the throttle 58 may be omitted from the narrow passage.

In the clutch 11, the annular piston (clutch piston) 55, pressure plate 46, and clutch disk 45 are enclosed in the clutch cover 44, and those are driven by the engine 80 by means of the flex plate 48 which is fixed on the end of the crankshaft 81 as shown in FIG. 3. Driving torque is conveyed to the transmission side when the clutch disk 45 is sandwiched between the pressure plate 46 and clutch cover 44 by the clutch piston 55.

The clutch piston 55 is fitted with the trigger springs 56, which step up the hydraulic pressure by one step just before the beginning of clutch engagement. This change in hydraulic pressure (trigger pressure) is monitored by the pressure sensor 60 which is installed in the high-pressure side hydraulic clutch control line 21 and is fed into the electronic control unit 35.

Since a common oil hydraulic clutch is provided with a oil hydraulic cylinder and pressure oil is supplied in the oil hydraulic cylinder, the oil hydraulic cylinder urges a pressure plate against a clutch disk with a clutch cover, when the clutch is engaged. Consequently, the common oil hydraulic clutch is suddenly engaged. Therefore, a shock torque is generated in the common oil hydraulic clutch.

On the other hand, in the present invention pressure oil is supplied in the high pressure side cylinder chamber 53 of the oil hydraulic clutch servo cylinder 47 when the clutch 11 is engaged, and when the ring piston 55 is moved along the cylinder 52 in the right direction, the trigger spring 56 applies a reaction force on the clutch piston 55 in the opposite direction against the movement of the clutch piston 55 and step up a little hydraulic pressure in the high pressure cylinder chamber 53.

The stepped up hydraulic pressure is called a "trigger pressure". A pressure sensor is used to detect the trigger pressure.

Since the flow rate of pressure oil which is supplied in the high pressure side cylinder chamber 53 can be controlled in accordance with the trigger pressure, a shock torque is not generated in the clutch 11 and as a result, the clutch 11 is smoothly engaged.

As noted from the above, the trigger spring 56 is used to control the hydraulic pressure in thei high pressure side cylinder 53.

This is one of the factors that enables the truck to start moving or to change speed without any stroke of the clutch 11.

Since a common mechanical friction clutch generates a clutch torque that is the product of the clamping force of pressure plate and the coefficient of friction of clutch disk and also, the clamping force is given as the product of the spring constant and deflection of the pressure spring, the pressure plate requires a clutch stroke that exceeds the deflection of the pressure spring in order to separate the pressure plate from the clutch disk when the mechanical friction clutch is disengaged.

On the other hand, since the hydraulic clutch of the present invention generates a clutch torque that is the product of the oil pressure of the pressure oil and the piston area of the oil hydraulic clutch servo cylinder 47, the oil pressure is reduced to zero when the clutch 11 is disengaged, and as the result, the clutch torque becomes at zero.

Accordingly, the clutch 11 does not require the clutch stroke for operating the clutch.

The transmission 12 is a full synchromesh countershaft type. The gear shift unit which comprises the shift cylinder 13, select cylinder 14, shift solenoid valves 15, 16, and select solenoid valves 17, 18, 19 and located on the gear shift housing of a gear case, uses a layout in which the shift and select rods are laid across each other and whose push and pull action can be performed by the shift cylinder 13 and select cylinder 14. The shift cylinder 13 and select cylinder 14 are designated to have a small diameter. The requirement of lower height than the chassis frame called for this layout, which made the whole package compact.

The smaller diameter cylinders 13 and 14 have a smaller stroke volume respectively, and which have the following two technical effects. The one is to increase the stroke speed of each of the cylinders 13 and 14, because the smaller stroke volume can be filled with oil quickly. The other technical effect is the higher compensating ability of shifting force and is to be given the smaller change of the force corresponding to a change in pressure control.

Previously, the shift speed or shift force, when increased, tended to impair the durability of a synchronizer ring. The above-mentioned two technical effects, however, enlarged the pressing load on the synchronizer ring and the PV value to such a degree that the shift time was minimized without losing the durability of the synchronizer ring.

The hydraulic system control circuit 20 includes the flow control valve 24 for controlling the high pressure side and low pressure side hydraulic clutch control lines 21 and 22, the hydraulic transmission control line 23, an oil hydraulic pump 36 and the flow rate of pressure oil discharged from the oil hydraulic pump 36.

The high pressure side hydraulic clutch control line 21 is connected with the discharging side of the oil hydraulic pump 36 and the high pressure side cylinder chamber 53 of the clutch control cylinder 47. The clutch/transmission select valve 27 is disposed at the upstream side thereof. The check valve 30 is disposed at the upstream side of the clutch/transmission select valve 27. The stop valve 32 is disposed at the downstream side of the clutch/transmission select valve 27.

The low pressure side hydraulic clutch control line 22 is connected with the discharging side of the oil hydraulic pump 36 and the low pressure side cylinder chamber 54 of the clutch control cylinder 47. The pressure control valve 28 is disposed at the upstream side thereof. The downstream side of the pressure control valve 28 is branched and, the back pressure valve 31 is disposed at the branched line 62.

The high pressure side and low pressure side hydraulic clutch control lines 21 and 22 connect the downstream sides of the stop valve 32 and pressure control valve 28 together, and the connected place is provided with the short circuit valve 33.

The hydraulic transmission control line 23 connects the discharging side of the oil hydraulic pump 36 to the shift cylinder 13 via the shift solenoid valves 15 and 16 and connects the discharging side of the oil hydraulic pump 36 to the select cylinder 14 via the select solenoid valves 17, 18 and 19.

The flow control valve 24 is disposed at the upstream side of a throttle 63, and is driven by oil pressure guided from the downstream side of the throttle 63 by a pressure lead line 64. The valve 24 returns excessive pressure oil to the intake side of the oil hydraulic pump 36 by a pump bypass 65, and thus controls the flow rate of pressure oil flowing in the hydraulic control lines 21, 22 and 23 and restricts the pressure fluctuation of the hydraulic control lines 21, 22 and 23 due to the fluctuation of flow rate of pressure oil fed by the oil hydraulic pump 36 according to the number of rotations of the engine 80.

The clutch/transmission select valve 27 is actuated by oil pressure at the downstream side of the throttle 63 which is switched by the short and stop solenoid valve 34 and oil pressure at the downstream side of the pressure control valve 28 and stops pressure oil flowing in the high pressure side hydraulic clutch control line 21 and flows pressure oil into the hydraulic transmission control line 23, since a transmission torque is cut by the oil hydraulic clutch 11 when the transmission 12 is gear changed by the shift cylinder 13 and select cylinder 14. In other words, the clutch/transmission select valve 27 makes it possible that the oil hydraulic clutch 11 is connected and disconnected and the transmission 12 is gear shifted only by a single oil hydraulic pump 36.

The stop valve 32 and short circuit valve 33 are actuated by the throttle 63 which is switched by the short and stop solenoid valve 34 and when transmission torque is cut by the oil hydraulic clutch 11, the stop valve 32 is closed and the short circuit valve 33 is opened. As a result, the high pressure side and low pressure side hydraulic clutch control lines 21 and 22 are shorted with each other, thereby to instantaneously cut the oil hydraulic clutch 11.

The clutch oil spray circuit 25 is constituted so that the flow rate of pressure oil discharged from the oil hydraulic pump 37 and sprayed to a clutch disk 45 of the oil pressure clutch 11 is adjusted by the oil spray control valve 26. The clutch oil spray circuit 25 includes an oil cooler 66, an oil spray relief valve 67, and an oil spray pressure valve 68.

The oil spray control valve 26 is disposed at the downstream side of the oil cooler 66 of the clutch oil spray circuit 25 to control the flow rate of the pressure oil sprayed to the clutch disk 45 and also, is connected to the downstream side of the clutch/transmission select valve 27 of the high pressure side hydraulic clutch control line 21 by a pressure lead line 69 so as to be actuated by the pilot oil pressure introduced from the high pressure side hydraulic clutch control lines 21. Of course, the pressure lead line 69 is provided with a clutch hydraulic sensor 60.

The oil spray control valve 26 is constructed as such that an auxiliary oil spray line 70 can be used in order to reduce the flow rate of oil spray when the oil hydraulic clutch 11 is cut. That is, the oil spray control valve 26 is actuated by the pilot oil pressure and regulates the flow rate according to various states of the oil hydraulic clutch 11 such as disconnected state, semiconnected state and connected state.

As stated, the hydraulic circuit of the automated mechanical transmission system 10 consists of two parts: the hydraulic system control circuit 20 and clutch oil spray circuit 25. The oil hydraulic pumps 36 and 37 of both the circuits 20 and 25 are driven by the drive gear 50 fitted to the clutch cover 44 so as to feed the oil whenever the engine 80 is running. Also, to prevent the control of the pressure control valve 28 from being disturbed by changes in engine speed, the flow rate to the system control circuit 20 is held constant by the flow control valve 24.

The spray volume is also regulated by the oil spray control valve 26 so that it is increased when the clutch 11 is half engaged, and decreased when fully engaged or disengaged.

In the system control circuit 20, the shift solenoid, select solenoid, short circuit valves 15, 16, 17, 18, 19, and 33 are normally closed while the pressure control, clutch/transmission select, and valves 28, 27, and 32 are open. Under this conditions, the oil flows through the route (A), (B), (C), (D), (E) and (F), and is pressurized slightly at (A), (B), (C) by the check valve 30-(Y) and back pressure valve 31-(Z). The slightly pressurized oil pushes back the ring piston 55 at (C) for the clutch 11 to disengage.

The pressure at (A) is regulated by the pressure control valve 28. The pressure, which opens the clutch/transmission select valve 27 by giving (G) a pilot pressure, flows into (D) through (E) to engage the clutch 11. The pressure at (E), which is proportional to the converting torque, is fed back to the electronic control unit 35 by the pressure sensor 60. If the short circuit valve 33 is opened and the stop valve 32 is closed with the short and stop solenoid valve 34 sliding to the right, the converting torque is removed without any stroke of the clutch 11 but only by the equalized pressure at (C) and (D). Under this condition, gear select or shift can be performed by opening and closing valves 15, 16, 17, 18, and 19. When shifting gears, the pressure at (A), which is proportional to the shifting force, is controlled by the pressure control valve 28.

The pressure at (E) works as the pilot pressure for the oil spray control valve 26. When the pressure is low, that is, when the clutch 11 is disengaged, the spray volume of the oil is decreased to reduce the oil drag of the clutch 11. When the pressure is increasing, that is, when the clutch 11 is slipping, the volume is increased to prevent wear of the clutch facing and to ensure smooth slip.

The pressure control valve 28, which is regulated by the pressure control pilot valve 29 driven by the electronic control unit 35, performs the most important task in operating the clutch and transmission 11 and 12.

In the performance, the current, the pressure, and the output shaft speed of the transmission 12 are fed back to the electronic control unit 35. Also, the electronic control unit 35 actively controls the system 10 by changing the parameters according to the oil temperature and other operating conditions.

Figure 4:
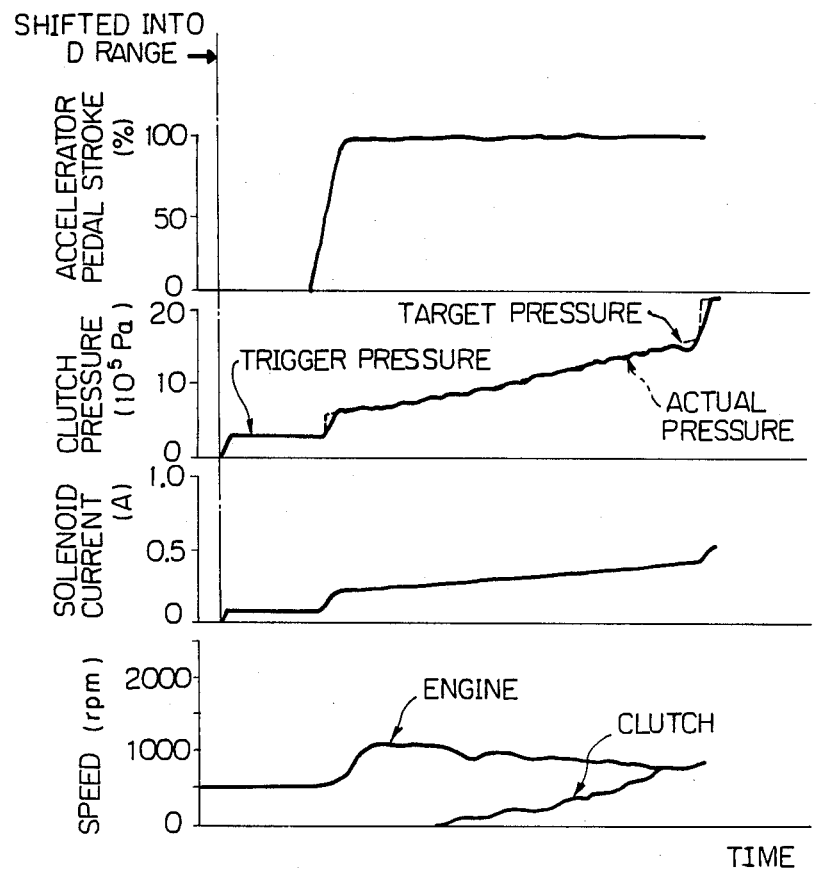
FIG. 4 is an illustration showing the characteristics of start moving of the automated transmission system.

With respect to the start moving software of the system 10, FIG. 4 shows pressure changes in the process of engaging the clutch 11. The step-up-point of pressure, just before the beginning of clutch engagement, is the trigger pressure for the electronic control unit 35 to recognize. For a prompt start, the pressure for clutch control is usually kept at the trigger point, so that as soon as the accelerator pedal is depressed for a start, the clutch 11 begins to engage at once, along with the increasing pressure.

And also, the gear shifting software of the system 10 is as following.

Figure 5:
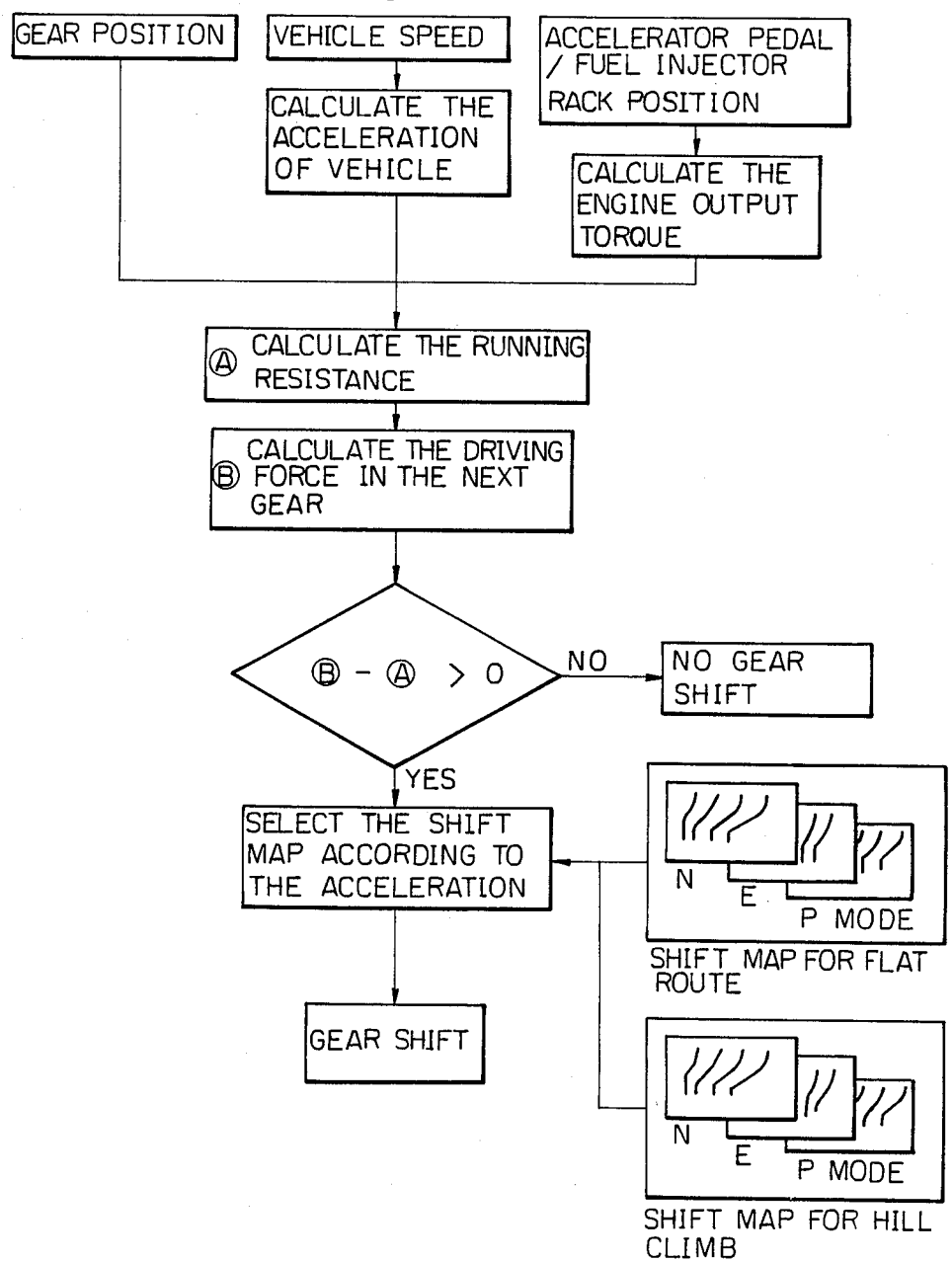
FIG. 5 is an illustration showing the acceleration/hill climb logic of the automated transmission system.
Figure 7:
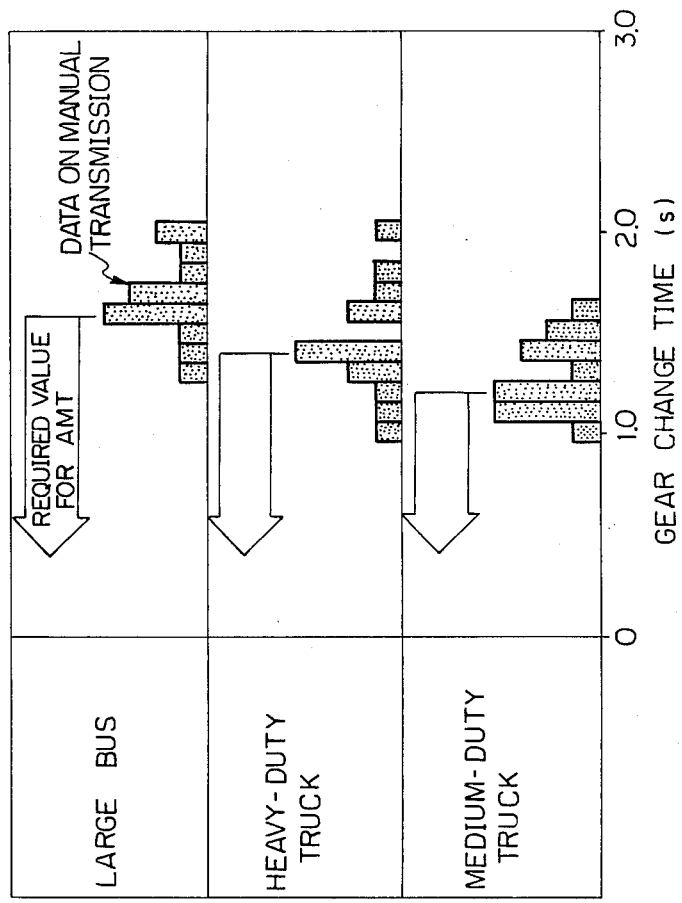
FIG. 7 is an illustration showing the necessity of shortening gear time for large sized-vehicles.

For quick gear shifting, the clutch 11 is disengaged with no stroke, and also the shifting force is controlled to the most effective value of the "shift pressure multiplied by slip speed of synchronizer ring". Furthermore, an accelerate logic and a hill climb logic are also used (FIG. 5). The accelerate logic slides the gear shift point to the lower side of the truck speed when acceleration of the truck is greater, and to the higher side when it is smaller for a better balance of economy and power. The hill climbs logic decides whether the next up-shift should be done or not, by calculating the excess of engine torque. This logic can prevent repetition of unnecessary gear shifting.

A skip-shift logic, which shiftss up or down into not the next step but another gear, selects the most accelerative gear, jumping over the gear step when the accelerator pedal is depressed more deeply than usual. A pre-down-shift logic readies the control for the next acceleration by shifting down prior to the depression of the accelerator pedal. These logics satisfy the particular needs of medium-duty trucks for quick accelerator response.

For a responsive running of a vehicle, not only acceleration but also proper deceleration is necessary. A weak point of an automatic transmission with a torque converter is that deceleration is inadequate without a retarder.

In the case of the system 10, however, deceleration is sufficient, because the current gear is held when the accelerator pedal is released, and the clutch 11 conveys engine-brake-torque without slipping. This makes a long downhill drive safer and easier.

Further, though the hydraulic pressure control system 10 has many advantwages as mentioned above, this system 10 requires adaptive controls to compensate for changes in oil viscosity with temperature. The system 10, therefore, features temperature controls as shown in FIG. 6. For example, control (1) in FIG. 6 has two purposes: one is for quick warming of clutch oil and the other is for prevention of starting shock caused by the delay in oil flowing into the clutch 11. Control (3) in FIG. 6 is to prevent gear-shift noise in the lower oil temperature range.

This logic gives better drivability than the manual shift transmission just after engine start in severe cold districts.

Furthermore, the system 10 is estimated in view of easy drive and economy. For estimating the easy drive, inventor's definition of easy drive rate is a rate expressing how much easier driving has become. It is the percentage of driving operations.

The easy drive rate of the system 10 has reached a level even better than that of electronically controlled transmission.

And for estimating the economy, inventor raises fuel consumption as the standard of estimation.

The fuel consumption of the system 10 virtually becomes that of manual shift transmission.

As set forth hereinbefore, it will be understood from the concrete example which has been described with reference to the drawings that various modifications of and changes in design may be readily made by those having common knowledge in the art to which the instant invention pertains. Further, it will be understood that insofar as the content of the invention is essential to its constitution in order to accomplish the subject matter thereof, and is desired for the technical substance of the invention, an embodiment which is objectively considered as having the content of the invention inherent therein may be substituted for it.

What is claimed is:

1. An automated mechanical transmission system for use in commercial vehicles comprising:
   an oil spray type oil hydraulic clutch having a fly wheel, a pressure plate mounted on the fly wheel, a clutch cover secured to the fly wheel, a clutch disk rotatably mounted between the clutch cover and pressure plate, and an oil hydraulic clutch control cylinder disposed in the fly wheel for moving the pressure plate such that the clutch disk is sandwiched between the pressure plate and the clutch cover;

a mechanical transmission coupled to the clutch having a shift cylinder, a plurality of shift valves, a select cylinder, and a plurality of select valves;

a hydraulic system control circuit coupled to the clutch and transmission and including an oil hydraulic pump, a high pressure side clutch line and a low pressure side hydraulic clutch control line coupled to the clutch, a hydraulic transmission control line connected with said shift cylinder and select cylinder of the transmission through said plurality of shift valves and select valves, and a flow control valve for controlling the flow rate of pressure oil discharged from the oil hydraulic pump;

a clutch oil spray circuit coupled to the clutch and the hydraulic control system and having an oil spray control valve for controlling the flow rate of oil which is sprayed to said clutch disk;

a clutch/transmission select valve disposed in said high pressure side hydraulic clutch control line; and a pressure control valve disposed at said low pressure side hydraulic clutch control line and having a pressure control pilot valve.

2. The automated mechanical transmission system as claimed in claim 1, wherein said oil hydraulic clutch control cylinder includes a trigger spring for stepping up hydraulic pressure as the pressure plate approaches the clutch disk.

3. The automated mechanical transmission system as claimed in claim 1, wherein said oil hydraulic clutch control cylinder includes a piston having a communication passage for communicating a high pressure side cylinder chamber with a low pressure side cylinder chamber, and a throttle disposed at said communication passage.

4. The automated mechanical transmission system as claimed in claim 1, wherein said oil hydraulic clutch control cylinder includes a piston having a narrow passage for communicating a high pressure side cylinder chamber with a low pressure side cylinder chamber.

5. The automated mechanical transmission system as claimed in claim 1, wherein said oil hydraulic clutch includes a flex plate for stationarily connecting the fly wheel to a crank shaft of an engine.

6. The automated mechanical transmission system as claimed in claim 1, wherein said high pressure side hydraulic clutch control line includes a check valve at an upperstream side of said clutch/transmission select valve, and said low pressure side hydraulic clutch control line is branched at a downstream side of said pressure control valve, said branch line having a back pressure valve.

7. The automated mechanical transmission system as claimed in claim 1, wherein said high pressure side hydraulic clutch control line includes a stop valve at a downstream side of said clutch/transmission select valve, a short circuit valve at a place where the downstream side of said stop valve of said high pressure side hydraulic clutch control line is connected with the downstream side of said pressure control valve of said low pressure side hydraulic clutch control line, and a short and stop solenoid valve for actuating said stop valve and short circuit valve.

8. The automated mechanical transmission system as claimed in claim 1, wherein said oil spray control valve is actuated by oil pressure of said high pressure side hydraulic clutch control line.

9. An automated mechanical transmission system for use in commercial vehicles comprising:

an oil spray type oil hydraulic clutch having a fly wheel secured to a crank shaft of an engine, a clutch cover secured to the fly wheel, a clutch disk disposed between the fly wheel and clutch cover so as to rotate in a space formed by the fly wheel and clutch cover, a pressure plate disposed face to face with the clutch disk, and an oil hydraulic clutch servo cylinder disposed in the fly wheel to hold the pressure plate and urge the pressure plate against the clutch disk with the clutch cover when the clutch is engaged;

a mechanical transmission having an input shaft with the clutch disk splined thereon, a shift cylinder and a select cylinder, and shift valves and select valves for controlling the direction of the flow of a pressure oil flowing in the corresponding shift cylinder and select cylinder;

a hydraulic system control circuit including a high pressure side hydraulic clutch control line connected with the discharging side of an oil hydraulic pump and a high pressure side cylinder chamber of the clutch servo cylinder, a low pressure side hydraulic clutch control line connected with the discharging side of the oil hydraulic pump and a low pressure side cylinder chamber of the clutch servo cylinder, a hydraulic transmission control line connected with the shift cylinder and select cylinder through the shift valves and select valves, and a flow control valve for controlling the flow rate of pressure oil discharged from the oil hydraulic pump;

a clutch/transmission select valve disposed in the high pressure side hydraulic clutch control line;

a pressure control valve disposed in the low pressure side hydraulic clutch control line and having a pressure control pilot valve; and a clutch oil spray circuit having an oil spray control valve connected with the downstream side of the clutch/transmission select valve of the high pressure side hydraulic clutch control line to introduce pilot oil pressure from the high pressure side hydraulic clutch control line, and being actuated by the pilot oil pressure so as to control the flow rate of oil which is sprayed to the clutch disk.

10. The automated mechanical transmission system as claimed in claim 9, wherein said oil hydraulic clutch servo cylinder has a trigger spring for stepping up hydraulic pressure as the pressure plate approaches the clutch disk.

11. The automated mechanical transmission system as claimed in claim 9, wherein said oil hydraulic clutch servo cylinder includes a piston having a communication passage for communicating a high pressure side cylinder chamber with a low pressure side cylinder chamber, and a throttle disposed at said communication passage.

12. The automated mechanical transmission system as claimed in claim 9, wherein said oil hydraulic clutch servo cylinder includes a piston having a narrow passage for communicating a high pressure side cylinder chamber with a low pressure side cylinder chamber.

13. The automated mechanical transmission system as claimed in claim 9, wherein said oil hydraulic clutch includes a flex plate for stationarily connecting the fly wheel to the crank shaft of said engine.

14. The automated mechanical transmission system as claimed in claim 9, wherein said high pressure side hydraulic clutch control line includes a check valve at an upstream side of said clutch/transmission select valve, and said low pressure side hydraulic clutch control line is branched at a downstream side of said pressure control valve, said branch line having a back pressure valve.

15. The automated mechanical transmission system as claimed in claim 9, wherein said high pressure side hydraulic clutch control line includes a stop valve at a downstream side of said clutch/transmission select valve, a short circuit valve at a place where the downstream side of said stop valve of said high pressure side hydraulic clutch control line is connected with the downstream side of said pressure control valve of said low pressure side hydraulic clutch control line, and a short and stop solenoid valve for actuating said stop valve and short circuit valve.

* * * * *